United States Patent
Joo

(10) Patent No.: US 9,909,734 B2
(45) Date of Patent: Mar. 6, 2018

(54) LENS, LIGHT-EMITTING DEVICE PACKAGE INCLUDING THE LENS, AND LIGHTING APPARATUS INCLUDING THE PACKAGE

(71) Applicant: LG INNOTEK CO., LTD., Seoul (KR)

(72) Inventor: Yang Hyun Joo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 39 days.

(21) Appl. No.: 14/936,120

(22) Filed: Nov. 9, 2015

(65) Prior Publication Data
US 2016/0138776 A1 May 19, 2016

(30) Foreign Application Priority Data
Nov. 19, 2014 (KR) .................. 10-2014-0161528

(51) Int. Cl.
*F21V 5/04* (2006.01)
*F21V 7/00* (2006.01)
*G02B 19/00* (2006.01)
*F21Y 115/10* (2016.01)

(52) U.S. Cl.
CPC .............. *F21V 5/04* (2013.01); *F21V 7/0091* (2013.01); *G02B 19/0061* (2013.01); *F21Y 2115/10* (2016.08)

(58) Field of Classification Search
CPC . F21V 5/04; F21V 5/041; F21V 5/043; F21V 5/044; F21V 5/045; F21V 5/046; F21V 5/048; F21V 7/0091; F21Y 2115/10; F21Y 2101/02
See application file for complete search history.

(56) References Cited

U.S. PATENT DOCUMENTS

| | | | |
|---|---|---|---|
| 6,598,998 B2 * | 7/2003 | West | H01L 33/58 257/E33.073 |
| 7,254,309 B1 * | 8/2007 | Chou | F21V 5/04 257/E33.073 |
| 7,438,444 B2 * | 10/2008 | Pao | G02B 19/0071 362/327 |
| 2006/0067079 A1 * | 3/2006 | Noh | F21V 7/0091 362/327 |
| 2010/0177495 A1 * | 7/2010 | Van Oers | F21V 5/04 362/84 |

* cited by examiner

*Primary Examiner* — Robert May
(74) *Attorney, Agent, or Firm* — Saliwanchik, Lloyd & Eisenschenk

(57) ABSTRACT

Embodiments provide a light-emitting device package including at least one light source and a lens disposed on the light source. The lens includes a lower surface facing the light source, an upper surface opposite to the lower surface, and a side surface located between the lower surface and the upper surface, the side surface having at least one indented portion.

20 Claims, 15 Drawing Sheets

LENS, LIGHT-EMITTING DEVICE PACKAGE INCLUDING THE LENS, AND LIGHTING APPARATUS INCLUDING THE PACKAGE

CROSS REFERENCE TO RELATED APPLICATION

This application claims priority under 35 U.S.C. § 119 to Korean Patent Application No. 10-2014-0161528, filed on Nov. 19, 2014, which is hereby incorporated by reference in its entirety.

TECHNICAL FIELD

Embodiments relate to a lens, a light-emitting device package including the lens, and a lighting apparatus including the package.

BACKGROUND

Semiconductor Light-Emitting Diodes (LEDs) are semiconductor devices that convert electricity into light, for example, infrared light using the characteristics of compound semiconductors so as to enable transmission/reception of signals, or that are used as a light source.

Group III-V nitride semiconductors are in the spotlight as core materials of light emitting devices such as, for example, LEDs or Laser Diodes (LDs) due to physical and chemical characteristics thereof.

The LEDs do not include environmentally harmful materials such as mercury (Hg) that are used in conventional lighting appliances such as, for example, fluorescent lamps and incandescent bulbs, and thus are very eco-friendly, and have several advantages such as, for example, long lifespan and low power consumption. As such, conventional light sources are being rapidly replaced with LEDs.

In the case of a conventional light-emitting device package including the light-emitting device described above and a lens disposed thereon, color separation, in which the color temperature of light emitted through the top of the lens and the color temperature of light emitted through the side of the lens are different, may problematically occur.

BRIEF SUMMARY

Embodiments provide a lens, a light-emitting device package including the lens and capable of improving color uniformity and a lighting apparatus including the package.

In one embodiment, a light-emitting device package includes at least one light source and a lens disposed on the light source, wherein the lens includes a lower surface facing the light source, an upper surface opposite to the lower surface, and a side surface located between the lower surface and the upper surface, the side surface having at least one indented portion.

For example, the side surface of the lens may include a lower portion below the indented portion and an upper portion above the indented portion, and the lower portion has a greater width than a width of the upper portion.

For example, the indented portion may be located at a middle height position of the lens.

For example, the indented portion may be indented in a linear form or in a curvilinear form.

For example, the upper surface of the lens may take the form of an upper recess configured to be concave toward the light source.

For example, the lower surface of the lens may take the form of a lower recess configured to receive at least a portion of the light source.

For example, the lower surface of the lens may have a flat shape.

For example, the side surface of the lens may include a lower side surface below the indented portion, and an upper side surface above the indented portion. The side surface of the lens may further include a central side surface between the lower side surface and the upper side surface, the indented portion being located at the central side surface.

For example, the light-emitting device package may further include a board configured to allow the light source to be mounted thereon, and a wavelength converter disposed between the lens and the light source.

For example, the wavelength converter may be disposed to surround an upper surface and a side surface of the light source.

For example, the lower surface of the lens may include a central lower surface located in a path of a light axis of the light source, the central lower surface facing the light source, and a peripheral lower surface disposed around the central lower surface. The lower surface of the lens may further include a boundary lower surface disposed between the central lower surface and the peripheral lower surface.

For example, the wavelength converter may be disposed between the upper surface of the light source and the central lower surface of the lens, between the side surface of the light source and the boundary lower surface of the lens, and between a portion of an upper surface of the board, on which the light source is not mounted, and the peripheral lower surface.

For example, the at least one indented portion may include a plurality of indented portions, and the number of the indented portions may increase as a width of the lens increases.

For example, the indented portion of the lens may have a symmetrical shape about a light axis.

For example, the light-emitting device package may further include a lens support part configured to support the lens, the lens support part being disposed on the board, and the light source may be disposed in a space defined by the lens support part, the lower surface of the lens, and an upper surface of the board.

In another embodiment, a light-emitting device package includes at least one light source, and a lens disposed on the light source, wherein the lens includes a light introduction surface facing the light source, a first light emission surface opposite to the light introduction surface, and a second light emission surface located between the light introduction surface and the first light emission surface, the second light emission surface having at least one indented portion, and wherein the lens has a greater lower width than an upper width thereof.

In a further embodiment, a lighting apparatus includes the light-emitting device package, and an optical member disposed above the light-emitting device package.

In a still further embodiment, a lens includes a light introduction surface facing a light source on which the lens is disposed, a first light emission surface opposite to the light introduction surface, and a second light emission surface located between the light introduction surface and the first light emission surface, the second light emission surface having at least one indented portion, and wherein the lens has a greater lower width than an upper width thereof.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
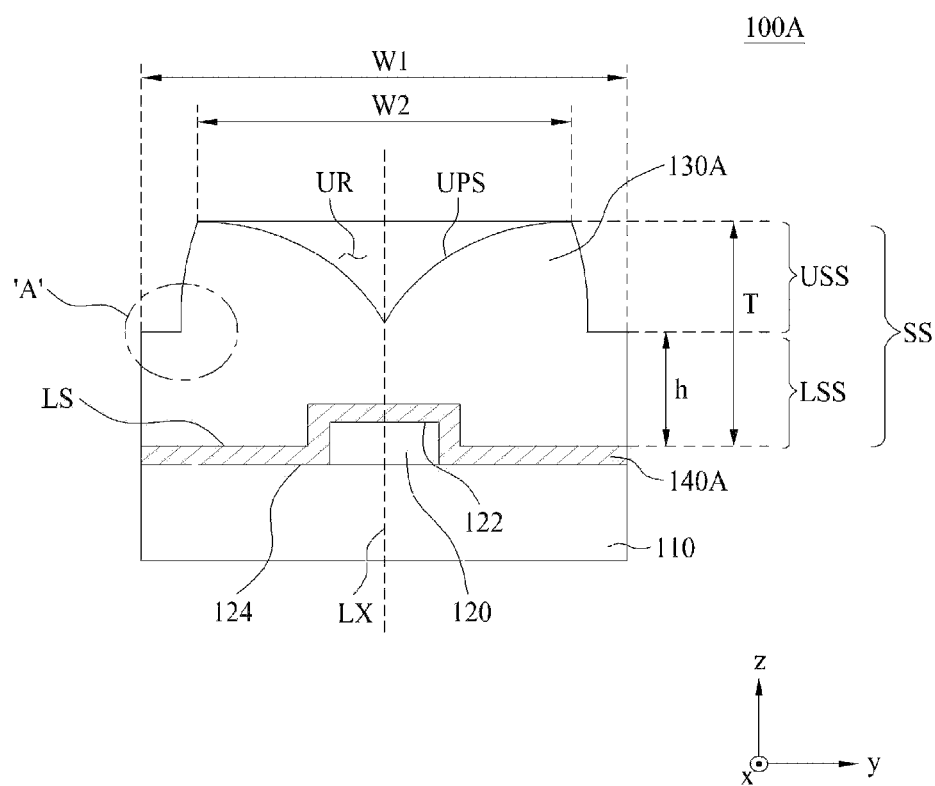
FIG. 1 is a sectional view of a light-emitting device package according to one embodiment.

Hereinafter, exemplary embodiments will be described in detail with reference to the accompanying drawings to aid in understanding of the embodiments. However, the embodiments may be altered in various ways, and the scope of the embodiments should not be construed as limited to the following description. The embodiments are intended to provide those skilled in the art with more complete explanation.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In addition, the relative terms "first", "second", "upper/top/above", "lower/bottom/under" and the like in the description and in the claims may be used to distinguish between any one substance or element and other substances or elements and not necessarily for describing any physical or logical relationship between the substances or elements or a particular order.

In the drawings, the thickness or size of each layer (or each portion) may be exaggerated, omitted or schematically illustrated for clarity and convenience. In addition, the size of each constituent element does not wholly reflect an actual size thereof.

Hereinafter, lens 130A, 130B, 130C, and 130D, light-emitting device packages 100A and 100B including the lens 130A to 130D, and a lighting apparatus 200 according to the embodiments will be described with reference to the accompanying drawings. For convenience, although the lens 130A to 130D, the light-emitting device packages 100A and 100B including the lens 130A to 130D, and the lighting apparatus 200 having the same according to the embodiments will be described using the Cartesian coordinate system (comprising the x-axis, the y-axis, and the z-axis), of course, it may be described using other coordinate systems. In addition, although the x-axis, the y-axis, and the z-axis in the Cartesian coordinate system are perpendicular to one another, the embodiments are not limited thereto. That is, the x-axis, the y-axis, and the z-axis may cross one another, rather than being perpendicular to one another.

Figure 2:
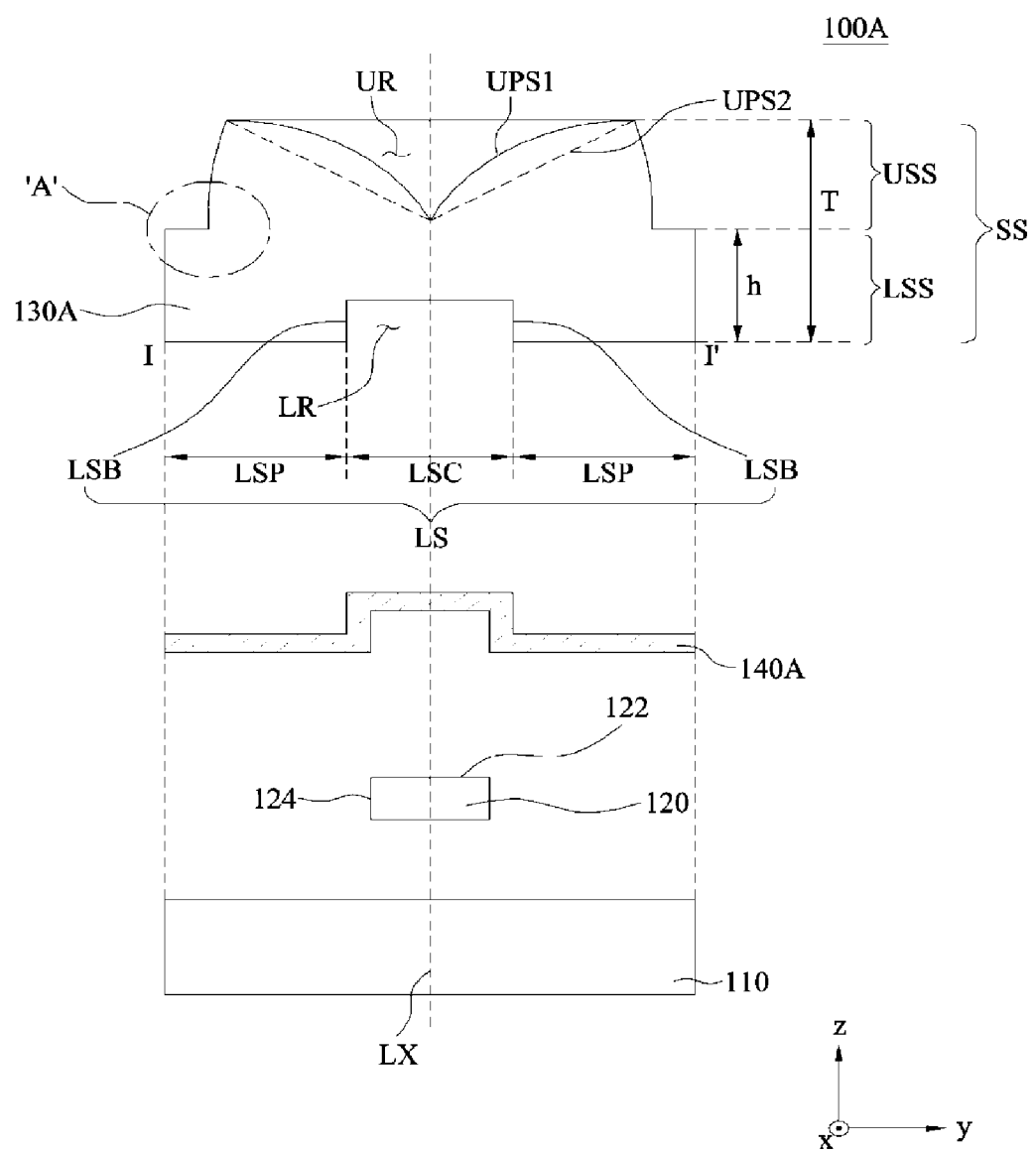
FIG. 2 is an exploded sectional view of the light-emitting device package illustrated in FIG. 1.
Figure 3:
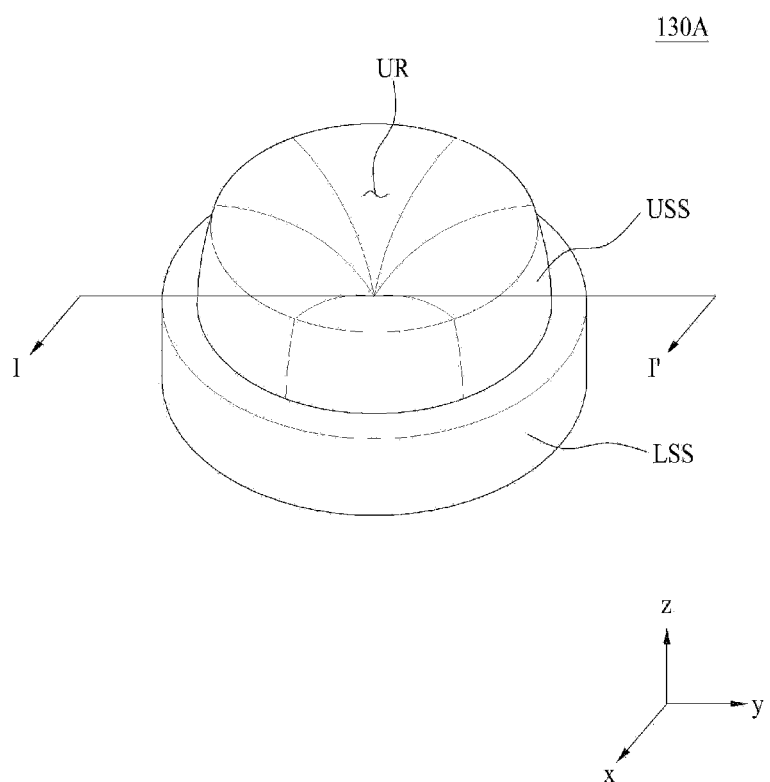
FIG. 3 is a perspective view illustrating one embodiment of a lens illustrated in FIG. 1.

FIG. 1 is a sectional view of a light-emitting device package 100A according to one embodiment, FIG. 2 is an exploded sectional view of the light-emitting device package 100A illustrated in FIG. 1, and FIG. 3 is a perspective view illustrating one embodiment of a lens 130A illustrated in FIG. 1.

Referring to FIGS. 1 and 2, the light-emitting device package 100A may include a board 110, a light source 120, a lens 130A, and a wavelength converter 140A.

The light source 120 may be mounted on the board 110. Here, the board 110 may be formed with an electrode pattern, which connects an adaptor for the supply of power and the light source 120 to each other. For example, the electrode pattern for the connection of the light source 120 and the adaptor may be formed on the upper surface of the board 110.

The board 110 may be a Printed Circuit Board (PCB) formed of any one material selected from among polyethylene terephthalate (PET), glass, polycarbonate (PC), and silicon (Si), or may take the form of a film.

In addition, the board 110 may be selected from among a single-layer PCB, a multi-layer PCB, a ceramic board, and a metal core PCB, for example.

The light source 120 may be a Light Emitting Diode (LED) chip. The LED chip may be configured as a blue LED chip or an ultraviolet LED chip, or may take the form of a package combining at least one or more selected from among a red LED chip, a green LED chip, a blue LED chip, a yellow-green LED chip, and a white LED chip.

Although the light source 120 and the lens 130A may be disposed to overlap each other in the direction of the light axis LX (e.g., the z-axis), embodiments are not limited as to the position of the light source 120. The light source 120 may be a top view type LED. In some cases, the light source 120 may be a side view type LED.

In the case of FIGS. 1 and 2, although one light source 120 is mounted on the board 110, embodiments are not limited thereto. That is, in another embodiment, of course, a plurality of light sources 120 may be mounted on the board 110.

The lens 130A may be disposed on the light source 120. The lens 130A may include a lower surface LS (or a light introduction surface), an upper surface UPS (or a first light emission surface UPS1 or UPS2), and a side surface SS (or a second light emission surface).

In the light-emitting device package 100A illustrated in FIGS. 1 and 2, although the lens 130A has the cross section shape taken along line I-I' of the lens 130A illustrated in FIG. 3, embodiments are not limited thereto. That is, in another embodiment, the lens 130A illustrated in FIGS. 1 and 2 may have a shape excluding the perspective view illustrated in FIG. 3.

The lower surface LS of the lens 130A may be the surface facing the light source 120, and may include a central lower surface LSC and a peripheral lower surface LSP. The central lower surface LSC may include the surface which is located in the path of the light axis LX and faces the light source 120, and the peripheral lower surface LSP may be located around the central lower surface LSC. In addition, the lower surface LS of the lens 130A may further include a boundary lower surface LSB located at the boundary between the central lower surface LSC and the peripheral lower surface LSP. That is, the boundary lower surface LSB may be located between the central lower surface LSC and the peripheral lower surface LSP.

As exemplarily illustrated in FIGS. 1 and 2, the lower surface LS of the lens 130A may have a lower recess LR. The lower recess LR may be configured to receive at least a portion of the light source 120. Here, although the lower recess LR is illustrated as having a rectangular cross-sectional shape, embodiments are not limited thereto. That is, instead of the rectangular cross-sectional shape, the lower recess LR may have any one of polygonal, circular, semi-spherical cross-sectional shapes, or combinations thereof.

In addition, the shape of the lower surface LS is not limited to the shape illustrated in FIGS. 1 and 2. That is, the lower surface LS may have any of various shapes so long as light emitted from the light source 120 may be introduced into and refracted by the lower surface LS of the lens 130A.

The upper surface UPS1 or UPS2 of the lens 130A may correspond to the surface opposite to the lower surface LS, and may have an upper recess UR. That is, the upper surface UPS1 or UPS2 may define the upper recess UR. Here, the upper recess UR may be concave toward the light source 120.

In addition, although the upper recess UR may have a symmetrical shape about the light axis LX in the direction (e.g., at least one of the x-axis or the y-axis) crossing the direction of the light axis LX (e.g., the z-axis), embodiments are not limited thereto. For example, referring to FIGS. 1 and 2, the upper recess UR may have a symmetrical cross-sectional shape in the y-axis about the light axis LX.

In addition, referring to FIGS. 1 and 2, although the upper surface UPS1 forming the upper recess UR may have a curvilinear shape and the upper surface UPS2 may have a linear shape, embodiments are not limited to the specific shape of the upper surfaces UPS1 and UPS2. That is, the upper surfaces UPS1 and UPS2 may have various shapes so long as light refracted at the lower surface LS may be refracted at the upper recess UR to thereby be emitted in the direction of the light axis LX (e.g., the z-axis) and may be reflected at the upper recess UR to thereby be directed to the side surface SS.

Meanwhile, the side surface SS of the lens 130A is the portion that is located between the lower surface LS and the upper surface UPS1 or UPS2 and causes the light refracted at the lower surface LS and/or the light reflected at the upper surface UPS to be refracted and emitted.

According to the embodiment, the side surface SS of the lens 130A may have at least one indented portion A. As exemplarily illustrated in FIGS. 1 to 3, the side surface SS of the lens 130A may be divided into a lower side surface LSS and an upper side surface USS on the basis of the indented portion A. The lower side surface LSS may correspond to the portion below the indented portion A and the upper side surface USS may correspond to the portion above the indented portion A.

The first width W1 of the lower side surface LSS which is a portion below the indented portion A of the side surface SS of the lens 130A may be greater than the second width W2 of the upper side surface USS which is a portion USS above the indented portion A. That is, the lower width W1 of the lens 130A may be greater than the upper width W2 of the lens 130A.

In addition, although the indented portion A illustrated in FIGS. 1 and 2 may be located at the position corresponding to the middle height h of the lens 130A, embodiments are not limited thereto. Here, the middle height h of the lens 130A may mean half the thickness T of the lens 130A.

FIGS. 4A to 4D are local sectional views of various embodiments A1 to A4 of the indented portion A illustrated in FIGS. 1 and 2.

Figure 4A:
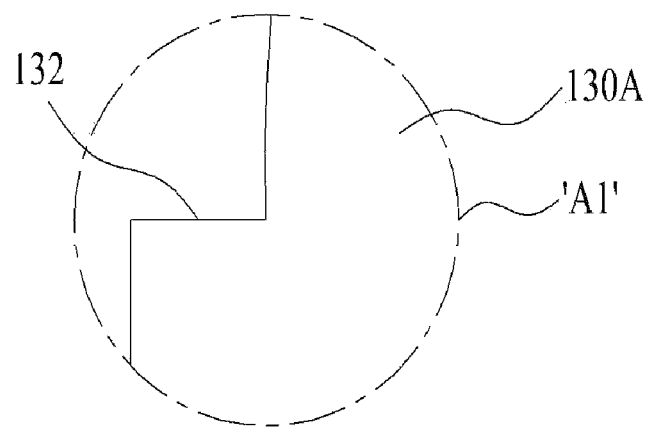
FIGS. 4A to 4D are local sectional views of various embodiments of an indented portion illustrated in FIGS. 1 and 2.
Figure 4B:
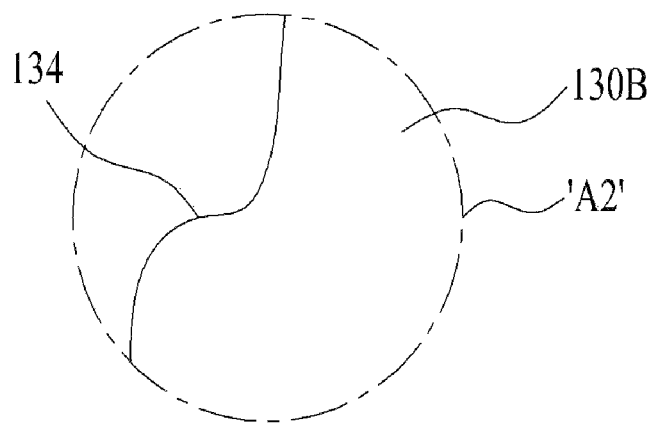
Figure 4C:
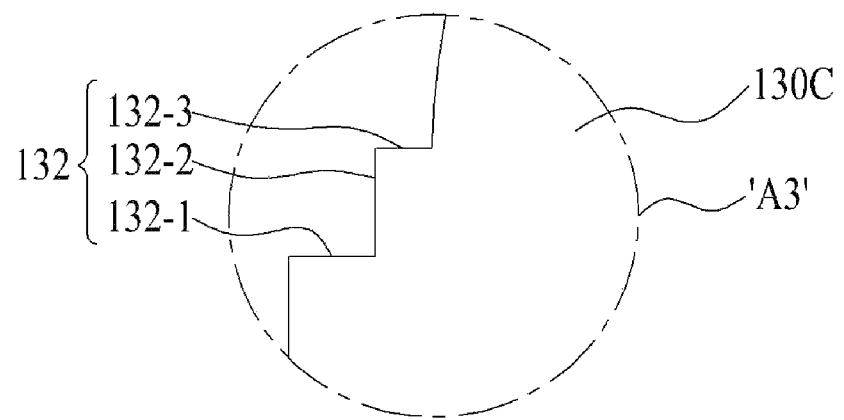
Figure 4D:
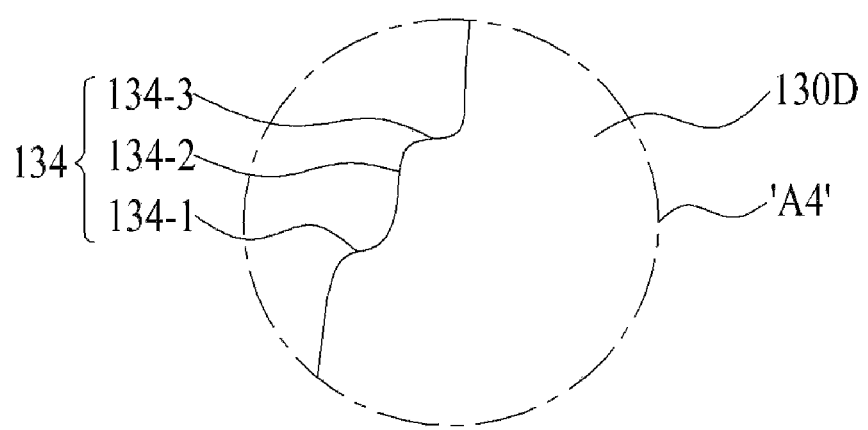

For example, the indented portion A1 or A3 may be indented (or, inclined) in a linear shape (e.g., a rectangular shape) 132, 132-1, 132-2 or 132-3 as exemplarily illustrated in FIG. 4A or 4C, and may be indented in a curvilinear shape (e.g., a circular shape) 134, 134-1, 134-2, or 134-3 as exemplarily illustrated in FIG. 4B or 4D.

In addition, there may be provided one indented portion A1 or A2 as exemplarily illustrated in FIG. 4A or 4B, and there may be provided a plurality of indented portions, for example, two indented portions A3 and A4 as exemplarily illustrated in FIG. 4C or 4D.

In addition, although the indented portions A; A1 to A4 of the lens 130A may have a symmetrical shape with respect to the light axis LX in the direction (e.g., at least one of the x-axis or the y-axis) crossing the direction of the light axis LX (e.g., the z-axis), embodiments are not limited thereto. For example, referring to FIGS. 1 and 2, the indented portions A; A1 to A4 may have a symmetrical cross-sectional shape in the y-axis with respect to the light axis LX.

The lens 130A may comprises a transparent material, and for example, may comprise silicon, polycarbonate (PC), acryl resin based material such as polymethylmethacrylate (PMMA), and glass.

In addition, the lens 130A may have any one of various shapes such as, for example, a spherical shape and an aspherical shape, and embodiments are not limited as to the specific shape of the lens 130A.

Meanwhile, the wavelength converter 140A may be disposed between the lens 130A and the light source 120. Referring to FIGS. 1 and 2, although the wavelength converter 140A may be disposed to surround the upper surface 122 and the side surface 124 of the light source 120, embodiments are not limited thereto. That is, embodiments are not limited as to the installation position of the wavelength converter 140A so long as the wavelength converter 140A can convert the wavelength of light emitted from the light source 120. To this end, the wavelength converter 140A may be disposed above the light source 120.

For example, referring to FIGS. 1 and 2, the wavelength converter 140A may be disposed between the upper surface 122 of the light source 120 and the central lower surface LSC of the lens 130A, may be disposed between the side surface 124 of the light source 120 and the boundary lower surface LSB of the lens 130A, and may be disposed between a portion of the upper surface of the substrate 110 excluding the portion at which the light source 120 is disposed and the peripheral lower surface LSP, without being limited thereto.

The wavelength converter 140A may be formed of silicon (Si), for example, and may include a fluorescent substance (or phosphors) so as to change the wavelength of light emitted from the light source 120. Although the fluorescent substance may include, as wavelength converter means, any one of YAG-based, TAG-based, silicate-based, or nitride-based fluorescent substances, which may convert the light generated from the light source 120 into white light, embodiments are not limited as to the kind of the fluorescent substance.

The YAG-based and TAG-based fluorescent substances may be selected from among (Y, Tb, Lu, Sc, La, Gd, Sm)3(Al, Ga, In, Si, Fe)5(O, S)12:Ce, and the silicate-based fluorescent substance may be selected from among (Sr, Ba, Ca, Mg)2SiO4:(Eu, F, Cl).

In addition, the sulfide-based fluorescent substance may be selected from among (Ca, Sr)S:Eu, (Sr, Ca, Ba)(Al, Ga)2S4:Eu, and the nitride-based fluorescent substance may be selected from among (Sr, Ca, Si, Al, O)N:Eu (e.g., CaAlSiN4:Eu β-SiAlON:Eu) or Ca-α SiAlON:Eu-based (Cax, My)(Si, Al)12(O, N)16 (here, M is at least one material of Eu, Tb, Yb, or Er and may be selected from among fluorescent substance components, and 0.05<(x+y)<0.3, 0.02<x<0.27, and 0.03<y<0.3).

A red fluorescent substance may be a nitride-based fluorescent substance including N (e.g., CaAlSiN3:Eu). The nitride-based red fluorescent substance has superior reliability with regard to external environments such as heat, moisture, etc., to a sulfide-based fluorescent substance, and has low risk of discoloration.

For example, when it is attempted to emit white light from the light-emitting device package 100A including the light source 120 which emits blue light, the wavelength converter 140A may comprise a yellow phosphor, may comprise both a red phosphor and a green phosphor, and may comprise all of a yellow phosphor, a red phosphor, and a green phosphor.

Figure 5:
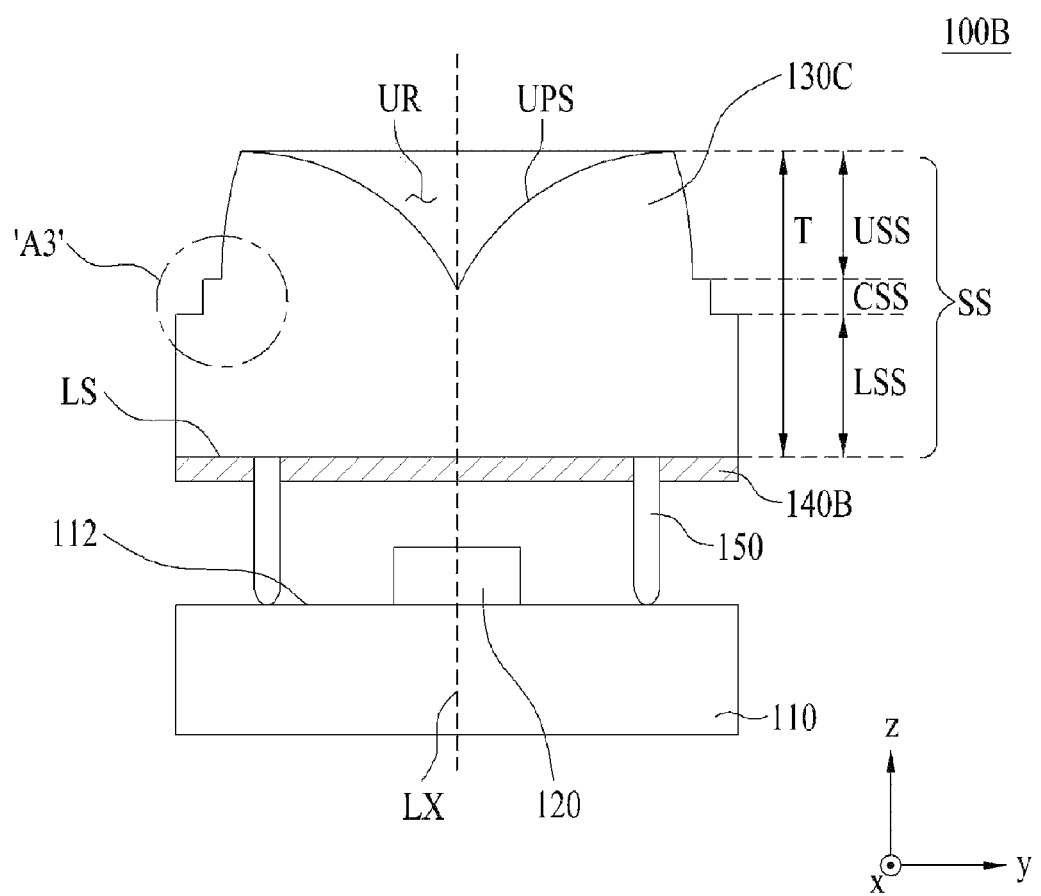
FIG. 5 is a sectional view of a light-emitting device package according to another embodiment.

FIG. 5 is a sectional view of a light-emitting device package 100B according to another embodiment.

The light-emitting device package 100B illustrated in FIG. 5 may include a board 110, a light source 120, a lens 130C, a wavelength converter 140B, and a lens support part 150. Here, the board 110 and the light source 120 are respectively the same as the board 110 and the light source 120 illustrated in FIGS. 1 and 2, and a repeated description thereof will be omitted below.

In the light-emitting device package 100A illustrated in FIGS. 1 and 2, the lower surface of the lens 130A has a lower recess LR. On the other hand, in the light-emitting device package 100B illustrated in FIG. 5, the lower surface of the lens 130C may have a flat shape, rather than having the lower recess LR.

In addition, the side surface SS of the lens 130A illustrated in FIGS. 1 and 2 includes only the lower side surface LSS and the upper side surface USS, whereas the side surface SS of the lens 130C illustrated in FIG. 5 may further include a central side surface CSS, in addition to the lower side surface LSS and the upper side surface USS. Here, the central side surface CSS of the side surface SS of the lens 130C may be the portion between the lower side surface LSS and the upper side surface USS, and may be included in the portion at which the indented portion A is located.

In addition, the side surface SS of the lens 130A illustrated in FIGS. 1 to 3 has a single indented portion A or A1, whereas the side surface SS of the lens 130C included in the light-emitting device package 100B illustrated in FIG. 5 has a plurality of indented portions A3.

In addition, the wavelength converter 140A illustrated in FIGS. 1 and 2 is located under the lower surface LS having the lower recess LR, and thus has an indented shape. On the other hand, the wavelength converter 140B illustrated in FIG. 5 is located under the flat lower surface LS of the lens 130C, and thus may have a flat shape.

In addition, unlike the light-emitting device package 100A illustrated in FIGS. 1 and 2, the light-emitting device package 100B illustrated in FIG. 5 may further include the lens support part 150. The lens support part 150 may support the lens 130C and may be disposed on the board 110. At this time, the light source 120 may be located in a space defined by the lens support part 150, the lower surface LS of the lens 130C (or the lower surface of the wavelength converter 140B), and the upper surface 112 of the board 110.

The lens support part 150 may be integrated with the lens 130C, or may be a separate part configured to be attached to, coupled to or inserted into the lens 130C. Although the cross-section of FIG. 5 illustrates that a pair of lens support parts 150 is arranged respectively at the left and right sides of the light axis LX, the lens support parts 150 illustrated at the left and right sides of the light axis LX may be configured in a single body. In this case, the lens support part 150 may be shaped to surround the light axis LX.

Except for the above-described difference, the light-emitting device package 100B illustrated in FIG. 5 is the same as the light-emitting device package 100A illustrated in FIGS. 1 and 2, and thus are designated by the same reference numerals, and a repeated description thereof will be omitted below.

Generally, color separation occurs because light emitted through the side surface and the upper surface of the lens hits the fluorescent substance different numbers of times, and thus the light is not uniformly mixed in a lens. In consideration of this, in the case of the light-emitting device packages 100A and 100B according to the embodiments, at least one indented portion A is provided at the side surface SS of the lens 130A to 130D such that light emitted from the side surface SS of the lens 130A or 130D is totally reflected into the lens 130A to 130D by the indented portion A. Thereby, as the number of times that light hits the fluorescent substance inside the lens 130A to 130D increases, color deviation may be reduced. That is, by changing the number of times that light is recycled inside the lens 130A to 130D and mixing the light emitted through the side surface SS of the lens 130A to 130D, color deviation may be reduced.

Hereinafter, light-emitting device packages according to a comparative embodiment and an embodiment will be described with referring the attached drawings. At this time, although the light-emitting device package 100A according to the embodiment illustrated in FIGS. 1 and 2 is compared with the light-emitting device package according to the comparative embodiment, the following description may be applied to the case where the light-emitting device package 100B according to the embodiment illustrated in FIG. 5 is compared with the light-emitting device package according to the comparative embodiment.

Figure 6:
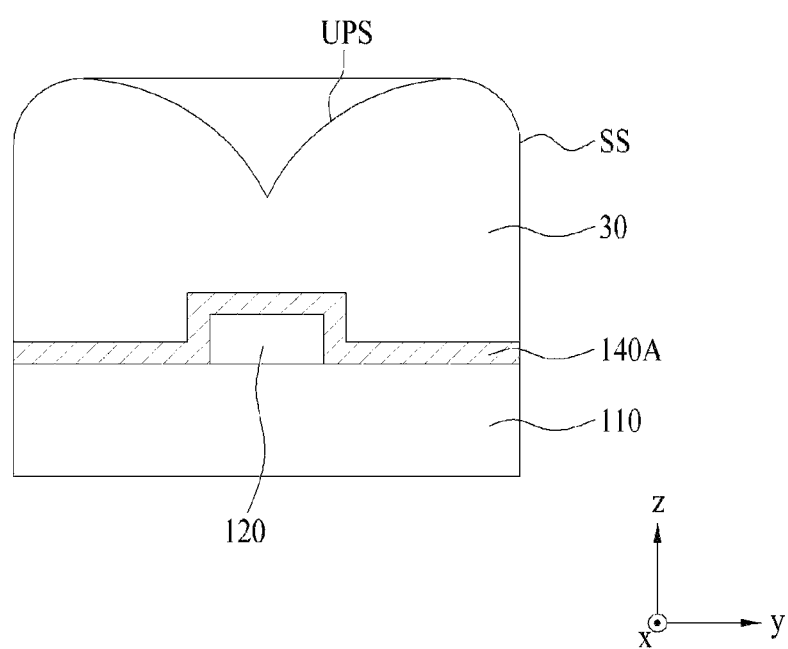
FIG. 6 is a sectional view of a light-emitting device package according to a comparative embodiment.

FIG. 6 is a sectional view of a light-emitting device package according to a comparative embodiment.

The light-emitting device package according to the comparative embodiment illustrated in FIG. 6 includes a board 110, a light source 120, a lens 30, and a wavelength converter 140A.

The side surface SS of the lens 130A included in the light-emitting device package 100A according to the embodiment illustrated in FIGS. 1 to 3 has the indented portion A, whereas the side surface SS of the lens 30 included in the light-emitting device package according to the comparative embodiment illustrated in FIG. 6 is flat without the indented portion A. Except for this, it is assumed that the light-emitting device package according to the comparative embodiment illustrated in FIG. 6 is the same as the light-emitting device package 100A according to the embodiment illustrated in FIGS. 1 and 5.

Figure 7A:
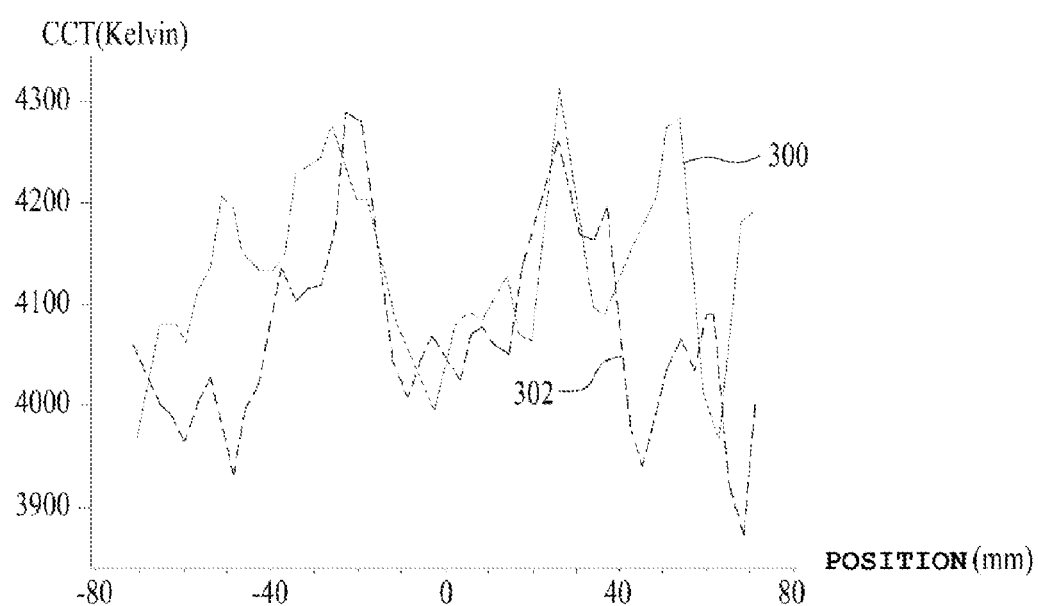
FIGS. 7A and 7B are graphs illustrating the distribution of correlated color temperature deviation of respective light-emitting device packages according to the comparative embodiment and the embodiment.
Figure 7B:
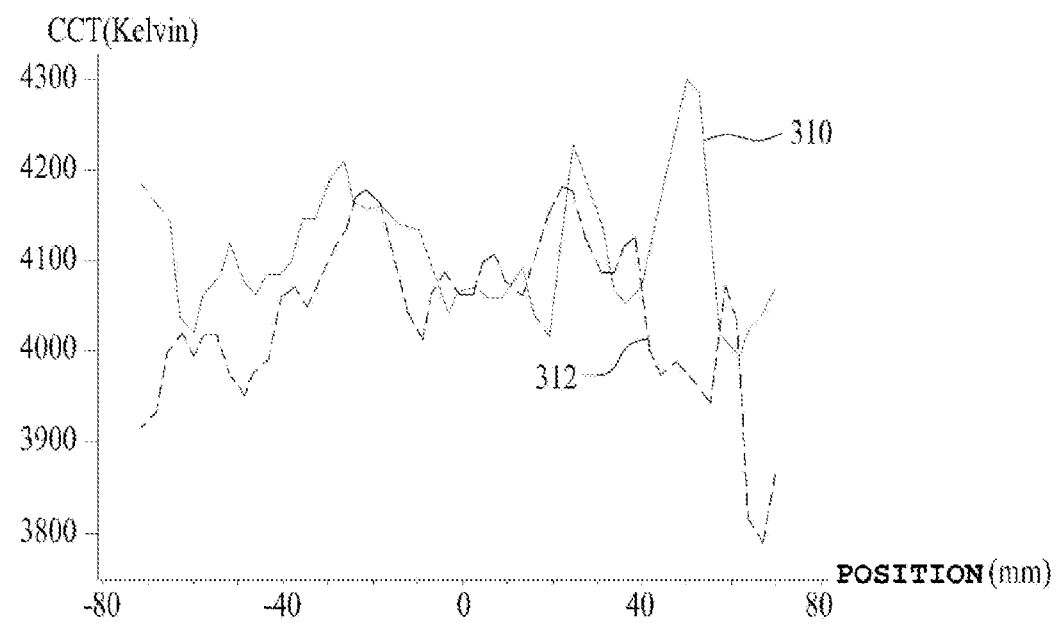

FIGS. 7A and 7B are graphs illustrating the distribution of Correlated Color Temperature (CCT) deviation of respective light-emitting device packages according to the comparative embodiment and the embodiment. In each graph, the horizontal axis represents the y-axis position, and the vertical axis represents the CCT. Here, the zero point of the horizontal axis corresponds to the point through which the light axis LX passes (y=0).

Figure 8A:
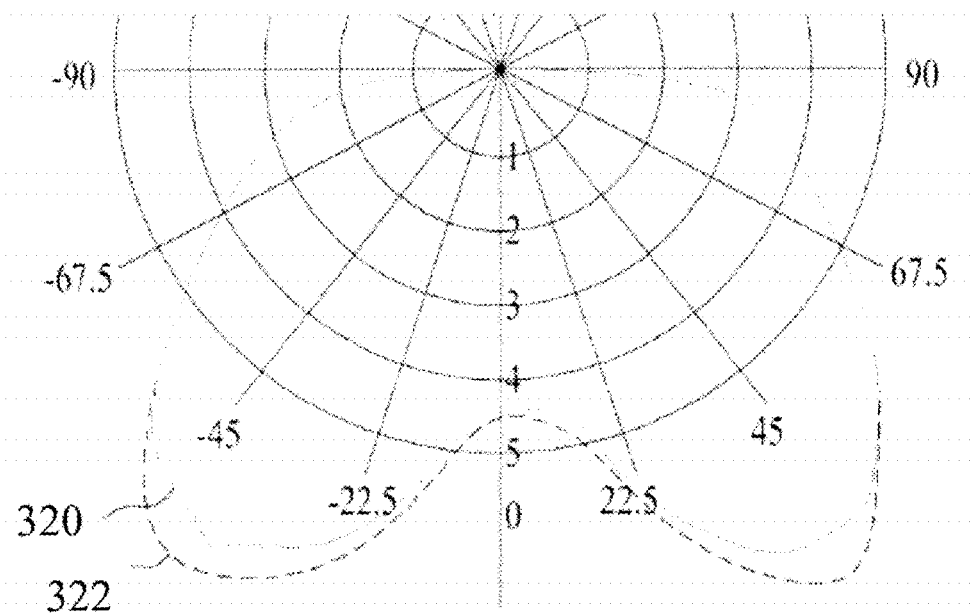
FIGS. 8A and 8B are views illustrating the viewing angle of the respective light-emitting device packages according to the comparative embodiment and the embodiment.
Figure 8B:
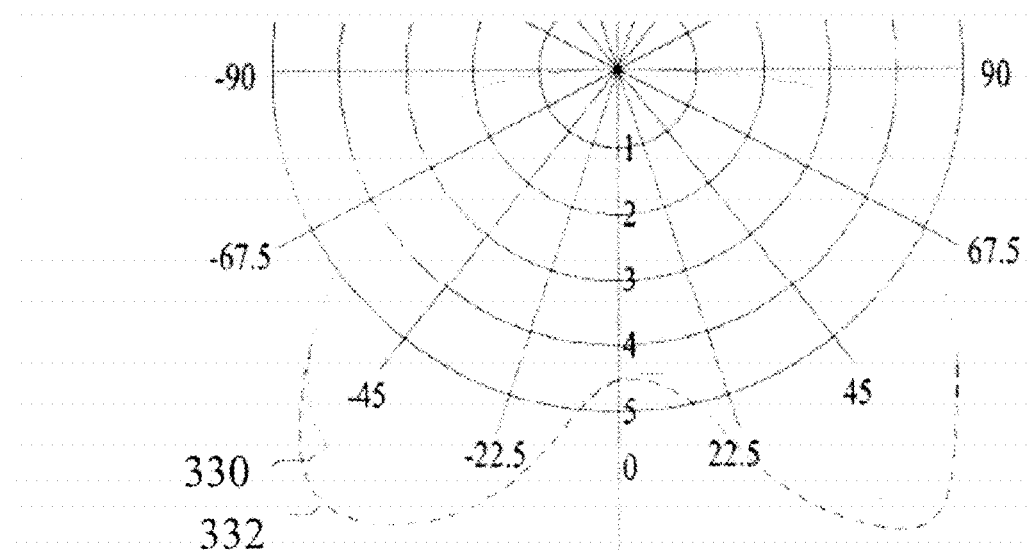

FIGS. 8A and 8B are views illustrating the viewing angle (or Full Width at Half Maximum (FWHM) of the respective light-emitting device packages according to the comparative embodiment and the embodiment.

When the light-emitting device packages according to the comparative embodiment and the embodiment have a rectangular shape in plan view, the shorter side in the rectangular shape is called the "short axis" and the longer side in the rectangular shape is called the "long axis". At this time, reference numerals 320 and 330 designate the viewing angle of light emitted from the cross-section of the short axis, and reference numerals 322 and 332 designate the viewing angle of light emitted from the cross-section of the long axis.

Referring to FIG. 7A, in the light-emitting device package according to the comparative embodiment, color temperature deviation between the CCT 300 of light emitted from the short-axis cross-section and the CCT 302 of light emitted from the long-axis cross-section is about 250K at ±27 mm (−27 mm≤y≤27 mm) from the center (y=0) of the lens 30.

On the other hand, in the case where the position h of the indented portion A in the lens 130A of the light-emitting device package 100A according to the embodiment is half the thickness T of the lens 130A, referring to FIG. 7B, it will be appreciated that color temperature deviation between the CCT 310 of light emitted from the short-axis cross-section and the CCT 312 of light emitted from the long-axis cross-section is about 130K at ±27 mm (−27 mm≤y≤27 mm) from the center (y=0) of the lens 30 and is smaller than that of the comparative embodiment.

Although the color temperature deviation is smaller than that of the light-emitting device package according to the comparative embodiment, it will be appreciated that the FWHM of the light-emitting device package according to the comparative embodiment illustrated in FIG. 8A and the FWHM of the light-emitting device package 100A according to the embodiment illustrated in FIG. 8B have the same value of 138°. As such, the light-emitting device package 100A according to the embodiment may reduce color temperature deviation while maintaining the same viewing angle as the viewing angle of the light-emitting device package according to the comparative embodiment.

Figure 9A:
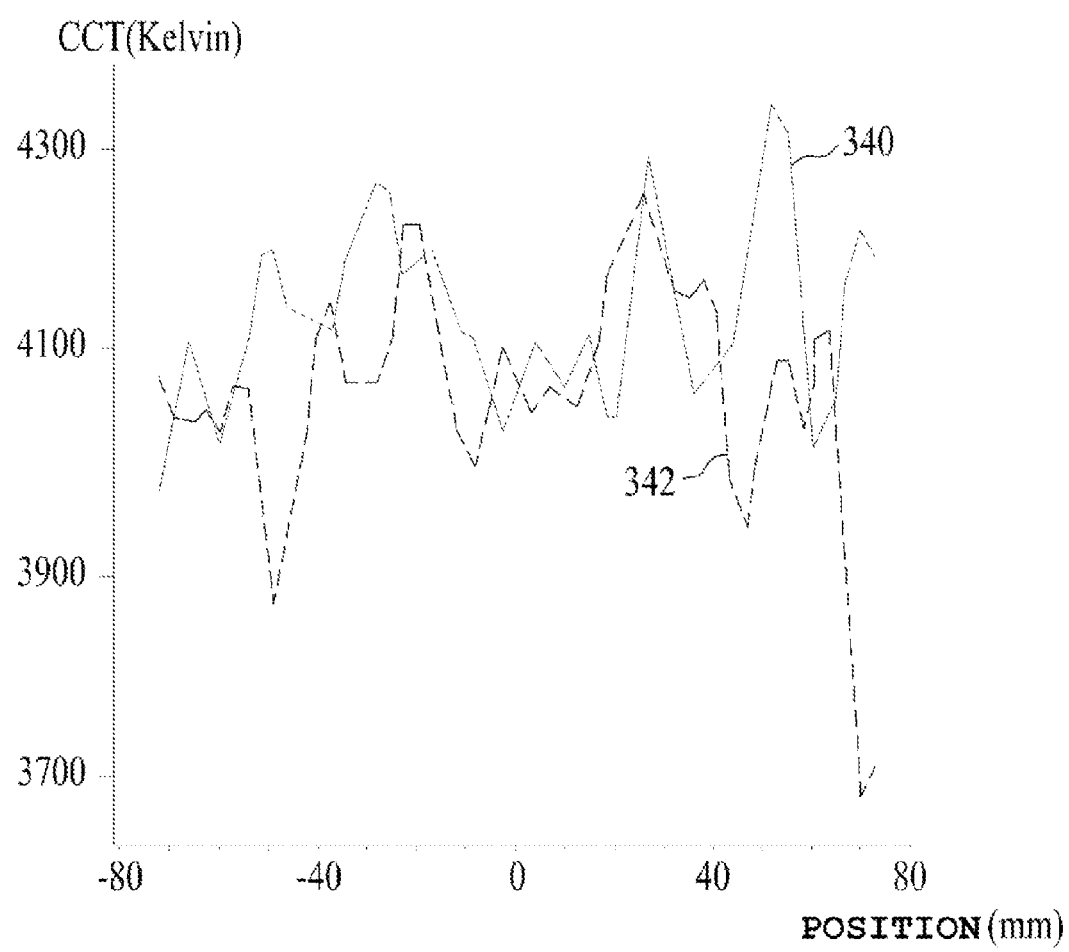
FIGS. 9A to 9C are graphs illustrating the distribution of correlated color temperature deviation based on the position of an indented portion of the lens included in the light-emitting device package according to the embodiment.
Figure 9B:
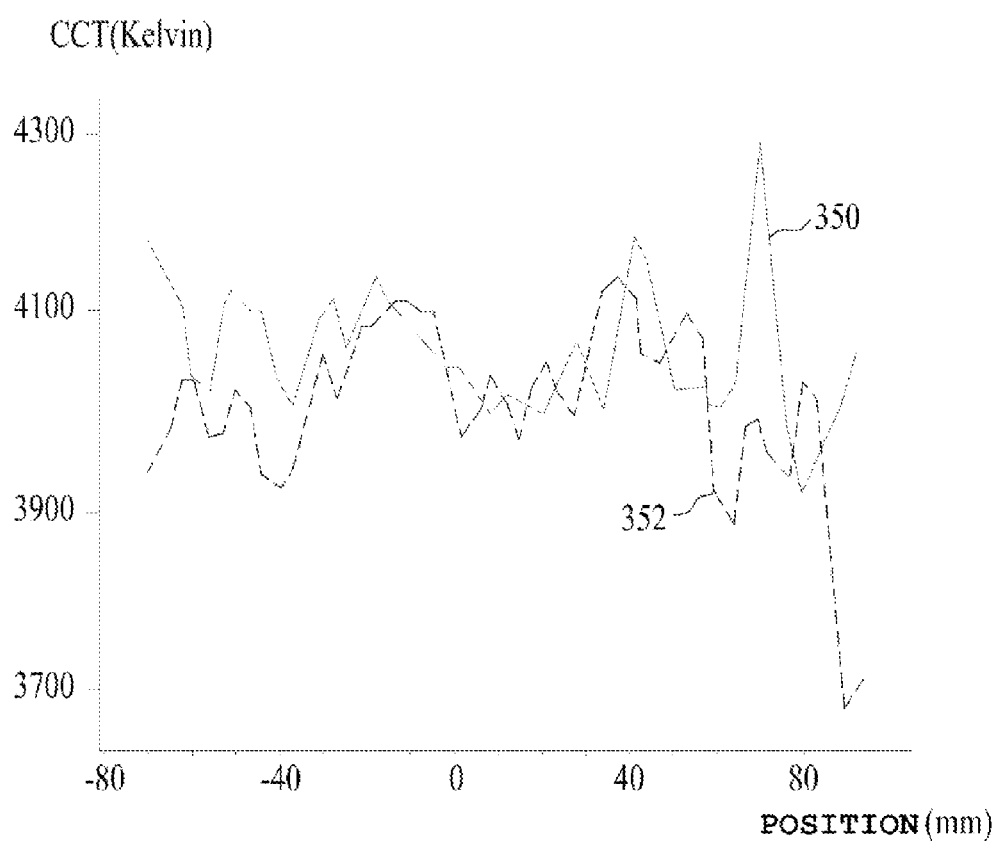
Figure 9C:
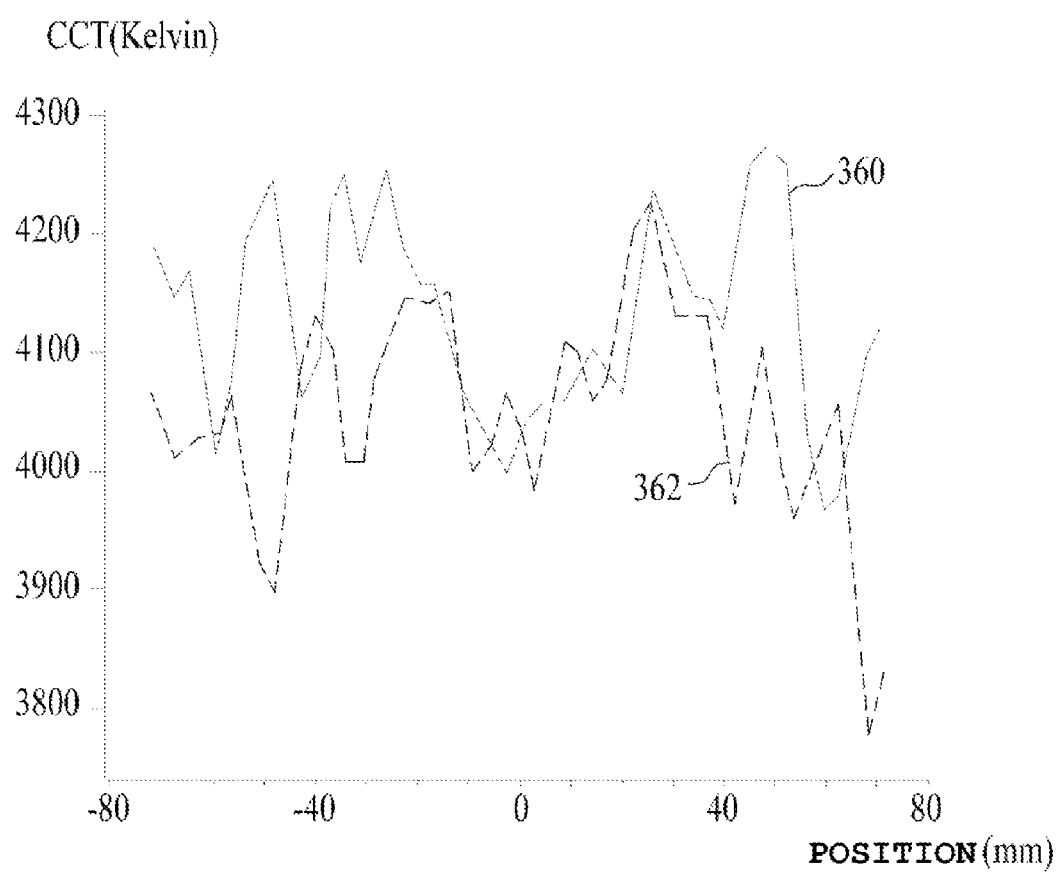

FIGS. 9A to 9C are graphs illustrating the distribution of correlated color temperature (CCT) deviation based on the position of the indented portion A of the lens 130A included in the light-emitting device package 100A according to the embodiment. In each graph, the horizontal axis represents the y-axis position, and the vertical axis represents the CCT. Here, the zero point of the horizontal axis corresponds to the point through which the light axis LX passes (y=0).

It is assumed that the total thickness T of the lens 130A illustrated in FIGS. 1 and 2 is 1 mm.

At this time, when the indented portion A is located at 0.35 mm (z=0.35) from the lower surface LS of the lens 130A (z=0), as exemplarily illustrated in FIG. 9A, CCT deviation between the CCT 340 of light emitted from the short-axis cross-section and the CCT 342 of light emitted from the long-axis cross-section is about 220K.

In addition, when the indented portion A of the lens 130A is located at 0.5 mm (z=0.5) from the lower surface LS (z=0) of the lens 130A (i.e. when the indented portion A is located at the position corresponding to the middle height h of the lens 130A), as exemplarily illustrated in FIG. 9B, CCT deviation between the CCT 350 of light emitted from the short-axis cross-section and the CCT 352 of light emitted from the long-axis cross-section is about 130K.

In addition, when the indented portion A is located at 0.75 mm (z=0.75) from the lower surface LS (z=0) of the lens 130A, as exemplarily illustrated in FIG. 9C, CCT deviation between the CCT 360 of light emitted from the short-axis cross-section and the CCT 362 of light emitted from the long-axis cross-section is about 270K.

In conclusion, it can be appreciated that the case where the indented portion A is located at the middle height h of the lens 130A as exemplarily illustrated in FIG. 9B has the smallest CCT deviation compared to the case where the position of the indented portion A of the lens 130A is higher or lower than the middle height h of the lens 130A.

In addition, color deviation may be reduced in the case where a plurality of indented portions A3 and A4 is provided as exemplarily illustrated in FIG. 4C or 4D compared to the case where a single indented portion A1 or A2 is provided as exemplarily illustrated in FIG. 4A or 4B. Accordingly, increasing the number of the indented portions A as the width of the lens 130A in the y-axis increases may further contribute to a reduction in color deviation.

In the case where an anisotropic secondary lens is used in order to solve the color separation of the related art, design becomes difficult and fabrication technologies are poor, which deteriorates optical characteristics, increases complexity in manufacture, and results in low luminous efficacy. Alternatively, when an aspherical lens is used, design may become difficult. On the other hand, in the case of the light-emitting device packages 100A and 100B according to the embodiments, because at least one indented portion A and A1 to A4 is formed at the side surface of the lens 130A to 130D, color separation described above may be eliminated, which results in uncomplicated processing and simplified design work and maintains illumination distribution, thereby achieving excellent luminous efficacy.

The light-emitting device packages according to the embodiments described above may be applied to various fields including, for example, a lighting apparatus, a display apparatus, and an indicator. For example, the lighting apparatus may be usefully used in the fields of a lamp, a streetlight, a linear module, a tube, and a wall washer for emotional lighting.

Hereinafter, a lighting apparatus including any one of the light-emitting device packages according to the embodiments described above will be described with reference to the accompanying drawings.

Figure 10:
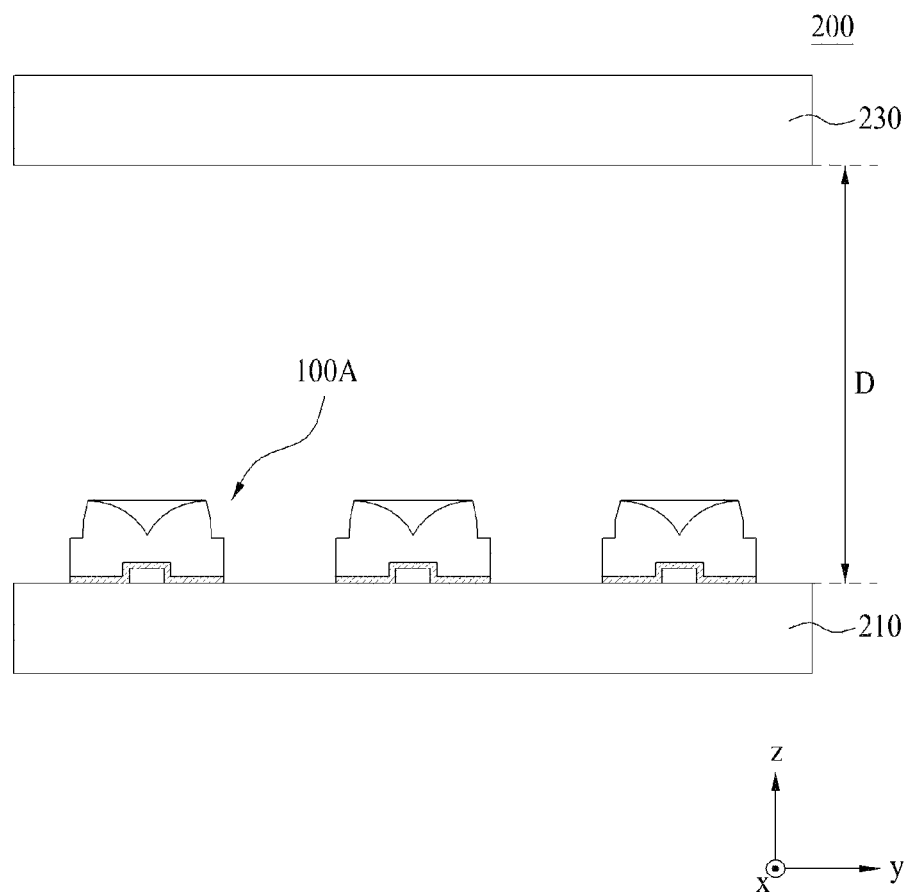
FIG. 10 is a sectional view of a lighting apparatus according to an embodiment.

FIG. 10 is a sectional view of a lighting apparatus 200 according to an embodiment.

The lighting apparatus 200 illustrated in FIG. 10 may include a board 210, a plurality of light-emitting device packages 100A, and an optical member 230.

As exemplarily illustrated in FIG. 10, the light-emitting device packages 100A may be mounted in an array form on the board 210 (e.g., a printed circuit board). Although the lighting apparatus 200 illustrated in FIG. 10 is illustrated as including the light-emitting device package 100A illustrated in FIGS. 1 and 2, embodiments are not limited thereto. That is, in another embodiment, the lighting apparatus 200 may include the light-emitting device package 100B illustrated in FIG. 5, instead of the light-emitting device package 100A.

The board 210 corresponds to the board 110 illustrated in FIGS. 1 and 2, and thus a repeated description thereof will be omitted.

The optical member 230 may be disposed above the light-emitting device package 100A. The optical member 230 serves to diffuse light emitted through the light-emitting device package 100A, and may be formed with a recessed pattern (not illustrated) on the upper surface thereof in order to increase diffusion effects.

The optical member 230 may be formed in a single layer or in multiple layers, and the recessed pattern may be formed on the uppermost layer of the multiple layers or on the surface of any one layer of the multiple layers. The recessed pattern may take the form of stripes extending in the longitudinal direction of the light-emitting device package 100A.

In some cases, the optical member 230 may include at least one sheet. For example, the optical member 230 may selectively include a diffuser sheet, a prism sheet, and a brightness increasing sheet, for example. The diffuser sheet serves to diffuse light emitted from the light-emitting device package 100A. The prism sheet serves to guide the diffused light to a light emission area. The brightness increasing sheet serves to increase the brightness.

When the lighting apparatus 200 includes the light-emitting device package 100A according to the above-described embodiment, color separation is reduced, which may reduce the distance D between the optical member 230 and the board 210. For example, although the distance D may be 40 mm or less, the embodiment is not limited thereto.

In addition, when the distance D is reduced, the lighting apparatus 200 may be reduced in thickness in the z-axis, thus having a slim shape. In addition, when a plurality of light-emitting device packages, which remove or reduce color separation, is adopted according to the embodiments, the lighting apparatus 200 may use a considerably reduced number of light-emitting device packages in order to realize the same color uniformity. That is, a considerably reduced number of light-emitting device packages compared to the related art is required for the lighting apparatus to realize the same color uniformity.

As is apparent from the above description, lens, light-emitting device packages including the lens, and lighting apparatuses including the same according to the embodiments are capable of preventing color separation and achieving a slim design as a result of having reduced color deviation while maintaining illumination distribution.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light-emitting device package, comprising:
at least one light source; and
a lens disposed on the light source,
wherein the lens includes:
a lower surface facing the light source;
an upper surface opposite to the lower surface; and
a side surface located between the lower surface and the upper surface, the side surface having a plurality of indented portions;
wherein the side surface of the lens comprises:
a lower portion below the indented portions; and
an upper portion above the indented portions, and
wherein widths of the indented portions decrease as approaching from the lower portion to the upper portion.

2. The package according to claim 1, wherein the lower portion has a greater width than a width of the upper portion.

3. The package according to claim 1, wherein the indented portions are located at a middle height position of the lens.

4. The package according to claim 1, wherein each of the indented portions is indented in a linear form.

5. The package according to claim 1, wherein each of the indented portions is indented in a curvilinear form.

6. The package according to claim 1, wherein the upper surface of the lens has the form of an upper recess configured to be concave toward the light source.

7. The package according to claim 1, wherein the lower surface of the lens has the form of a lower recess configured to receive at least a portion of the light source.

8. The package according to claim 7, further comprising:
a board configured to allow the light source to be mounted thereon; and
a wavelength converter disposed between the lens and the light source.

9. The package according to claim 8, further comprising a lens support part configured to support the lens, the lens support part being disposed on the board,
wherein the light source is disposed in a space defined by the lens support part, the lower surface of the lens, and an upper surface of the board.

10. The package according to claim 8, wherein the wavelength converter is disposed to surround an upper surface and a side surface of the light source.

11. The package according to claim 10, wherein the lower surface of the lens includes:
a central lower surface located in a path of a light axis of the light source, the central lower surface facing the light source and corresponding to a top surface of the recess; and
a peripheral lower surface disposed around the central lower surface.

12. The package according to claim 11, wherein the lower surface of the lens further includes a boundary lower surface disposed between the central lower surface and the peripheral lower surface.

13. The package according to claim 12, wherein the wavelength converter is disposed between the upper surface of the light source and the central lower surface of the lens, between the side surface of the light source and the boundary lower surface of the lens, and between a portion of an upper surface of the board, on which the light source is not mounted, and the peripheral lower surface.

14. The package according to claim 1, wherein the lower surface of the lens has a flat shape.

15. The package according to claim 1, wherein the side surface of the lens includes:
a lower side surface of the lower portion below the indented portions; and
an upper side surface of the upper portion above the indented portions.

16. The package according to claim 15, wherein the side surface of the lens further includes a central side surface between the lower side surface and the upper side surface, the indented portions being located at the central side surface.

17. The package according to claim 1,
wherein the number of the indented portions increases as a width of the lens increases.

18. The package according to claim 1, wherein the indented portions of the lens have a symmetrical shape about a light axis.

19. A lighting apparatus comprising:
- the light-emitting device package according to claim 1; and
- an optical member disposed above the light-emitting device package.

20. A lens, comprising:
- a light introduction surface facing a light source on which the lens is disposed;
- a first light emission surface opposite to the light introduction surface; and
- a second light emission surface located between the light introduction surface and the first light emission surface, the second light emission surface having a plurality of indented portions,
- wherein the lens has a greater lower width than an upper width thereof,
- wherein the second light emission surface of the lens comprises:
- a lower portion below the indented portions; and
- an upper portion above the indented portions, and
- wherein widths of the indented portions decrease as approaching from the lower portion to the upper portion.

* * * * *